(12) United States Patent
Cao et al.

(10) Patent No.: US 12,309,815 B2
(45) Date of Patent: May 20, 2025

(54) UPLINK TRANSMISSION (UL Tx) PREPARATION TIME

(71) Applicant: QUALCOMM Incorporated, San Diego, CA (US)

(72) Inventors: Yiqing Cao, Beijing (CN); Chenxi Hao, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/753,996

(22) PCT Filed: Oct. 26, 2019

(86) PCT No.: PCT/CN2019/113469
§ 371 (c)(1),
(2) Date: Mar. 21, 2022

(87) PCT Pub. No.: WO2021/077432
PCT Pub. Date: Apr. 29, 2021

(65) Prior Publication Data
US 2022/0338212 A1    Oct. 20, 2022

(51) Int. Cl.
*H04W 72/12* (2023.01)
*H04L 5/00* (2006.01)
(Continued)

(52) U.S. Cl.
CPC ......... *H04W 72/535* (2023.01); *H04L 5/0094* (2013.01); *H04W 72/1268* (2013.01)

(58) Field of Classification Search
CPC ........... H04W 72/535; H04W 72/1268; H04W 72/1257; H04L 5/0007; H04L 5/001; H04L 5/0048; H04L 5/0078; H04L 5/0094
See application file for complete search history.

(56) References Cited

U.S. PATENT DOCUMENTS

| 7,558,242 B1 * | 7/2009 | Hazenson | H04J 3/0602 |
| | | | 370/350 |
| 10,455,558 B2 | 10/2019 | Rico Alvarino et al. | |

(Continued)

FOREIGN PATENT DOCUMENTS

| CA | 3057283 A1 | 9/2018 |
| CN | 102754503 A | 10/2012 |

(Continued)

OTHER PUBLICATIONS

Intel Corporation: "Further Discussion on BWP Switching Delay", 3GPP TSG-RAN WG4 Meeting #88, R4-1809875 Further Discussion on BWP Switching Delay, 3rd Generation Partnership Project (3GPP), Mobile Competence Centre, 650, Route Des Lucioles, F-06921 Sophia-Antipolis Cedex France, vol. RAN WG4, No. Gothenburg, Sweden, Aug. 20, 2018-Aug. 24, 2018, 4 Pages, Aug. 10, 2018, XP051578909, Section 2.

(Continued)

*Primary Examiner* — Rasheed Gidado
(74) *Attorney, Agent, or Firm* — Patterson+ Sheridan, L.L.P.

(57) ABSTRACT

Certain aspects of the present disclosure provide techniques for uplink scheduling for communication on an uplink from a user equipment (UE) to a base station (BS). The uplink scheduling is based on uplink transmission (UL Tx) switching time and/or uplink data preparation time of the UE. The uplink data preparation time is calculated based on the UL Tx switching time. For example, a UE can report to a BS at least one of an indication of a UL Tx switching time and an uplink data preparation time of the UE. In return, the UE can receive an indication of uplink scheduling from the BS, which the UE can use to communicate with the BS.

27 Claims, 10 Drawing Sheets

(51) Int. Cl.
*H04W 72/1268* (2023.01)
*H04W 72/50* (2023.01)

(56) References Cited

U.S. PATENT DOCUMENTS

| | | | |
|---|---|---|---|
| 2009/0122731 A1* | 5/2009 | Montojo | H04L 27/2647 370/280 |
| 2010/0142416 A1 | 6/2010 | Kim | |
| 2019/0132845 A1* | 5/2019 | Babaei | H04L 1/1812 |
| 2019/0253938 A1 | 8/2019 | Sayenko et al. | |
| 2019/0261422 A1 | 8/2019 | Islam et al. | |
| 2020/0084753 A1* | 3/2020 | Li | H04W 72/23 |
| 2021/0227607 A1* | 7/2021 | Onaka | H04W 72/0453 |
| 2021/0235440 A1* | 7/2021 | Liang | H04W 72/21 |
| 2022/0022051 A1* | 1/2022 | Wu | H04W 16/14 |

FOREIGN PATENT DOCUMENTS

| | | |
|---|---|---|
| WO | 2017196546 | 11/2017 |
| WO | 2018204884 A1 | 11/2018 |
| WO | 2019193402 A1 | 10/2019 |

OTHER PUBLICATIONS

Mediatek Inc: "Summary for Cross-Slot Scheduling Power Saving Techniques", 3GPP TSG RAN WG1 Meeting #98, R1-1909831 (R1-190XXXX) Summary for Cross-Slot_Offline_summary_3_on Cross_slot Scheduling Power Saving Techniques, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, 13 Pages, Sep. 3, 2019, XP051766423, p. 7, section 3.1, Table p. 9, proposal 5.
Supplementary European Search Report—EP19950059—Search Authority—The Hague—Jun. 12, 2023.
International Search Report and Written Opinion—PCT/CN2019/113469—ISA/EPO—Apr. 30, 2020.
Vivo: "Discussion on Resource Multiplexing among Backhaul and Access Links", R1-1904071, 3GPP TSG RAN WG1 #96bis, Apr. 8-12, 2019, 5 pages.

* cited by examiner

UPLINK TRANSMISSION (UL Tx) PREPARATION TIME

BACKGROUND

Field of the Disclosure

Aspects of the present disclosure relate to wireless communications, and more particularly, to techniques for uplink scheduling for communication on an uplink from a user equipment (UE) to a base station (BS).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes reporting, to a base station (BS), at least one of: an indication of uplink transmission (UL Tx) switching time of the UE, and an indication of uplink data preparation time of the UE. The UL Tx switching time is a time for the UE to switch between transmitting on different frequency bands. The uplink data preparation time is between an end of a downlink reception and a start of an uplink transmission by the UE. The uplink data preparation time is calculated based on the UL Tx switching time. The method further includes receiving an indication of uplink scheduling from the BS based on the reporting. The method further includes communicating with the BS based on the uplink scheduling.

Certain aspects provide a method for wireless communication by a user equipment (UE). The method generally includes receiving an indication of uplink scheduling from a base station (BS). The uplink scheduling is based on a pre-defined uplink data preparation time. The uplink data preparation time is between an end of a downlink reception and a start of an uplink transmission by the UE. The method further includes communicating with the BS based on the uplink scheduling.

Certain aspects provide a user equipment (UE) and a non-transitory computer-readable storage medium having instructions stored thereon for performing the aforementioned methods for wireless communication by a UE. In some cases, the UE includes a memory and a processor coupled to the memory. In some cases, the UE includes one or more means for performing the aforementioned methods.

Certain aspects provide a method for wireless communication by a base station (BS). The method generally includes receiving, from a user equipment (UE), a report of at least one of an indication of uplink transmission (UL Tx) switching time of the UE, and an indication of uplink data preparation time of the UE. The UL Tx switching time is a time for the UE to switch between transmitting on different frequency bands. The uplink data preparation time is between an end of a downlink reception and a start of an uplink transmission by the UE. The uplink data preparation time is calculated based on the UL Tx switching time. The method further includes determining uplink scheduling for the UE based on the report. The method further includes transmitting an indication of the uplink scheduling to the UE. The method further includes communicating with the UE based on the uplink scheduling.

Certain aspects provide a method for wireless communication by a base station (BS). The method generally includes transmitting an indication of uplink scheduling to a user equipment (UE). The uplink scheduling is based on a pre-defined uplink data preparation time. The uplink data preparation time is between an end of a downlink reception and a start of an uplink transmission by the UE. The method further includes communicating with the UE based on the uplink scheduling.

Certain aspects provide a base station (BS) and a non-transitory computer-readable storage medium having instructions stored thereon for performing the aforementioned methods for wireless communication by a BS. In some cases, the BS includes a memory and a processor coupled to the memory to perform the aforementioned methods. In some cases, the BS includes one or more means for performing the aforementioned methods.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
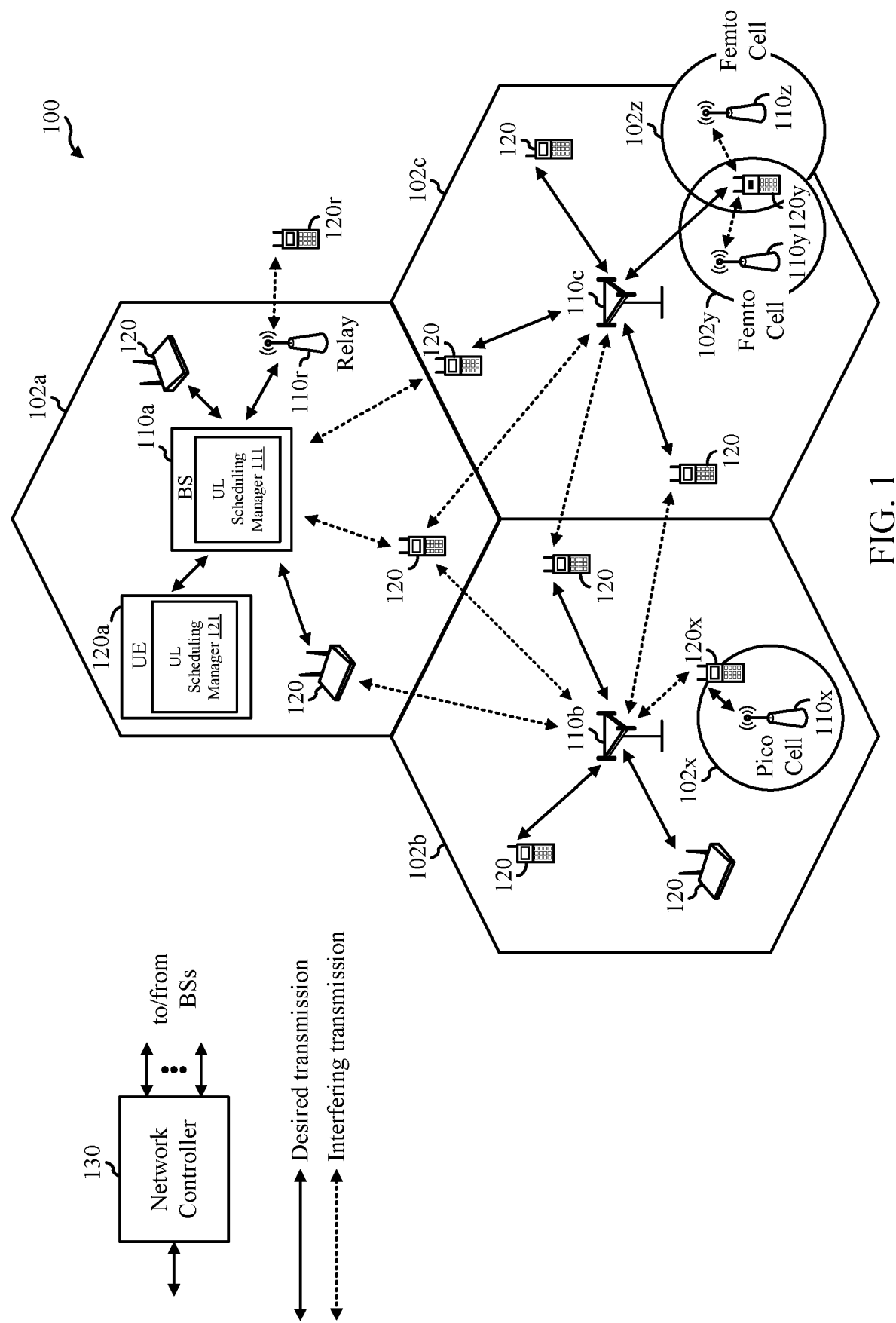
FIG. 1 is a block diagram conceptually illustrating an example telecommunications system, in accordance with certain aspects of the present disclosure.

Aspects of the present disclosure provide apparatus, methods, processing systems, and computer readable mediums for uplink scheduling for communication on an uplink from a UE to a BS based on uplink transmission (UL Tx) switching time and/or uplink data preparation time (also referred to as UL Tx preparation time) of the UE.

In certain aspects, such as due to thermal and power consumption limitations of a UE, the UE has a limited number of radio frequency (RF) chains for processing and receiving/transmitting signals. For example, a UE may have two RF chains (e.g., two transmit (Tx) chains, two transmit/receive chains, and/or two receive (Rx) chains). In certain aspects, the UE is configured to communicate on multiple frequency carriers/bands (e.g., using carrier aggregation (CA)), such as on an uplink. For example, if the UE has two Tx chains and is configured to communicate on two bands on an uplink, in certain aspects, the UE is configured to use one Tx chain per band.

However, in certain aspects, as an example, the UE is configured to use UL MIMO for communicating on an uplink, such as on a primary cell (Pcell) (e.g., on a time division duplex (TDD) band with 100 MHz bandwidth). In particular, in certain aspects, the UE may use multiple Tx chains for communication using MIMO on a single band on an uplink. Thus, in the two Tx chain example discussed, the UE may need to perform UL switching, where one or more Tx chains are switched between communicating on multiple different bands. For example, a Tx chain may be switched from communicating on a first band on an uplink at a first time, to communicating on a second band on an uplink at a second time. In another example, the UE may support UL switching to accommodate communication on a greater number of bands (e.g., three) than the UE has Tx chains (e.g., 2). It should be noted there may be other reasons a UE needs to support UL switching.

Certain issues may arise when a UE supports UL switching. For example, a time it takes for the UE to perform UL switching from one band to another (e.g., referred to herein as UL Tx switching time) may impact when the UE can communicate on an uplink, such as a physical uplink shared channel (PUSCH). In particular, the UE may not be able to communicate on the uplink while performing UL switching for the UL Tx switching time, and in some cases may not be able to even prepare data for transmission on the UL while performing UL switching for the UL Tx switching time. For example, the UL Tx switching time may affect an uplink data preparation time of the UE.

In one example, a UE may be scheduled to transmit data on an uplink (e.g., PUSCH) at a particular time. Further, it may take time (referred to as the uplink data preparation time) for the UE to process the data (e.g., prepare uplink data for transmission), such as using portions of a Tx chain of the UE, prior to the particular time, so that the UE can transmit the processed data at the particular time. For example, the uplink data preparation time (also referred to as the PUSCH preparation time) may be the time between an end of a time period when the UE performs downlink reception (e.g., on a physical downlink control channel (PDCCH), such as that provides an uplink grant to schedule the UE to transmit on the PUSCH) and a start of a time period when the UE performs uplink transmission (e.g., on the PUSCH, such as accounting for timing advance (TA)). In certain aspects, uplink data preparation time is defined in 3GPP TS 38.214 V15.7.0 (2019 September) hereby incorporated by reference in its entirety. In certain aspects, since preparing uplink data uses resources of the Tx chain, uplink data may not be able to be prepared while performing UL Tx switching, and therefore the UL switching time affects the uplink data preparation time.

Accordingly, certain aspects herein provide techniques for uplink scheduling that accommodate for UL Tx switching time of the UE. For example, certain aspects provide for a BS that is configured to schedule the UE to communicate on the uplink at time periods that are based on or accommodate for the UL Tx switching time of the UE. For example, certain aspects provide for an uplink data preparation time that is based on or accommodates for a UL Tx switching time.

In certain aspects, the UE is configured to report (e.g., transmit) an indication of one or more of its UL Tx switching time and its uplink data preparation time (e.g., as based on UL Tx switching time) to the BS, so the BS can schedule the UE for uplink communication. The UE and BS may then communicate on the uplink based on the uplink schedule.

In certain aspects, for a wireless communication network, the uplink data preparation time is pre-defined for UEs (e.g., different uplink data preparation times for different subcarrier spacings (SCSs) used for communication, or the same for all or multiple SCSs) in the wireless communication network (e.g., define in a standard), such as to accommodate for or based on UL Tx switching time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120a has a UL scheduling module 121 that may be configured for supporting uplink scheduling that accommodates for UL Tx switching time of the UE 120a, according to aspects described herein. For example, as shown in FIG. 1, the BS 110a has a UL scheduling module 111 that may be configured for supporting uplink scheduling that accommodates for UL Tx switching time of a UE, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
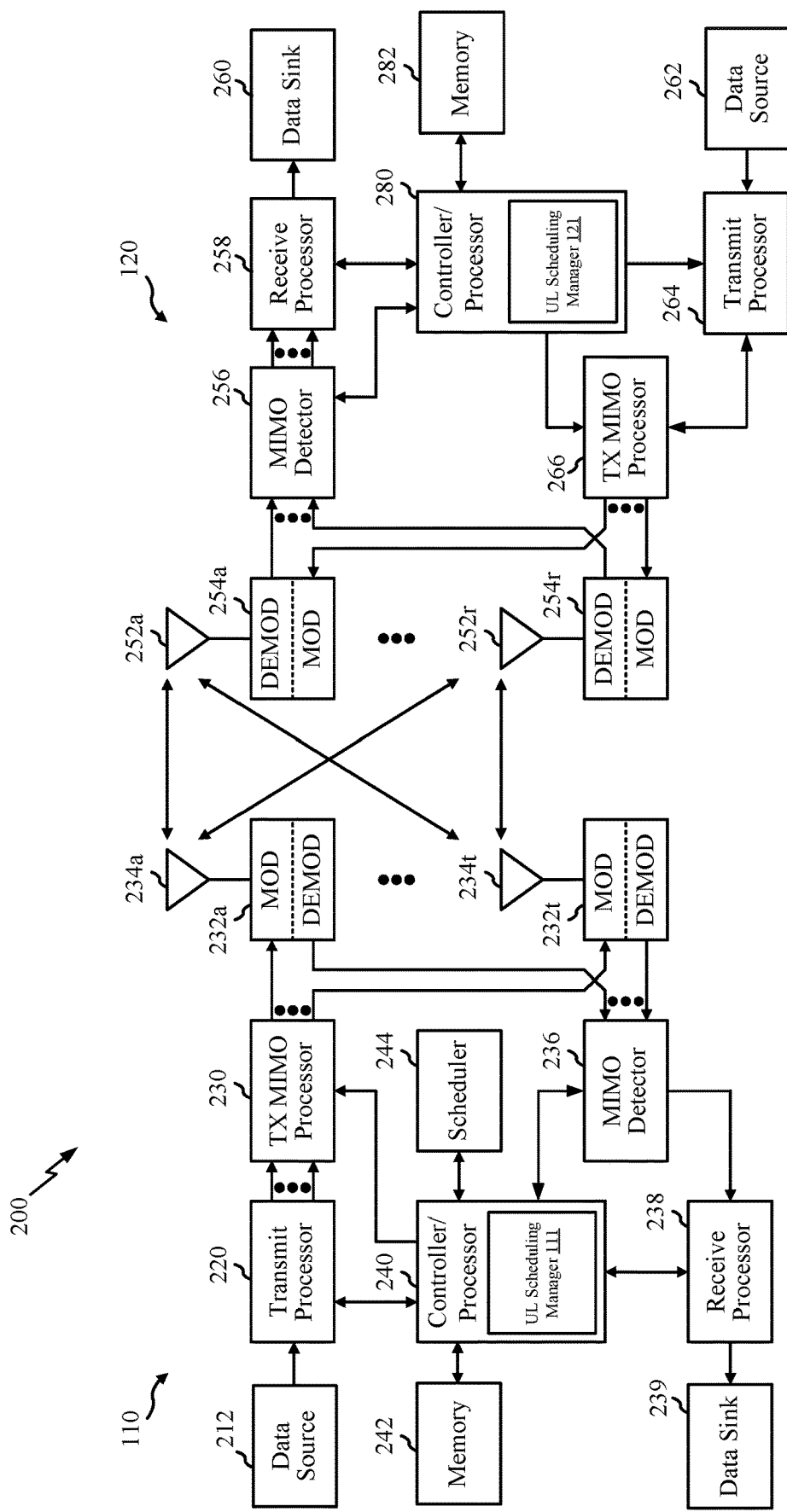
FIG. 2 is a block diagram illustrating an example architecture of a distributed radio access network (RAN), in accordance with certain aspects of the present disclosure.
Figure 4:
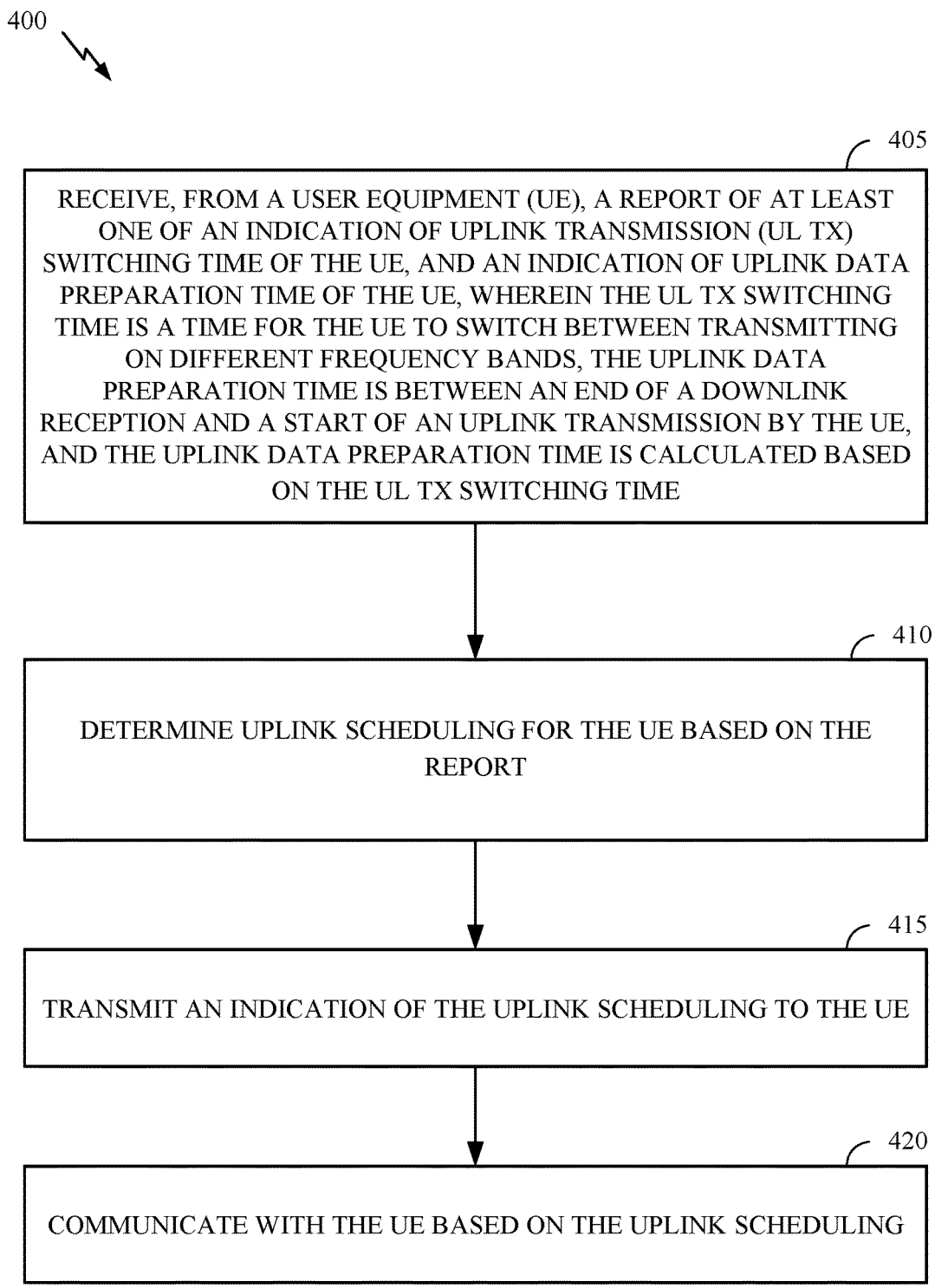
FIG. 4 is a flow diagram illustrating example operations for wireless communication by a BS, in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 4, the controller/processor 240 of the BS 110 has a UL scheduling module 111 that may be configured for supporting uplink scheduling that accommodates for UL Tx switching time of a UE, according to aspects described herein. For example, as shown in FIG. 4, the controller/processor 280 of the UE 120 has a UL scheduling module 121 that may be configured for supporting uplink scheduling that accommodates for UL Tx switching time of the UE 120, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example UL Tx Preparation Time

As discussed, certain aspects herein provide techniques for uplink scheduling that accommodate for UL Tx switching time of a UE, such as UE 120. In certain aspects, a BS, such as BS 110, schedules the UE to communicate on an uplink using resources (e.g., time resources, symbols, etc.) that are based on or accommodate for the UL Tx switching time of the UE 120. Further, the UE and BS may then communicate on the uplink using the resources.

In certain aspects, the UE 120 is configured to report its capability of UL Tx switching time (e.g., the (e.g., minimum) time in which the UE 120 can perform UL Tx switching) to the BS 110, such as using RRC signaling. In certain aspects, the UE 120 is configured to report its capability of uplink data preparation time (e.g., the (e.g., minimum) time in which the UE 120 can prepare uplink data for transmission while also accommodating for UL Tx switching time) to the BS 110, such as using RRC signaling. In certain aspects, the UE 120 is configured to report both its capability of UL Tx switching time and its capability of uplink data preparation time to the BS 110, such as using RRC signaling.

In certain aspects, the UL Tx switching time and/or the uplink data preparation time is reported from the UE 120 to the BS 110 as a number of symbols, for example based on SCS or as a single value regardless of SCS. In certain aspects, the UL Tx switching time and/or the uplink data preparation time is reported from the UE 120 to the BS 110 as a time value (e.g., an accurate time, actual time, number of μs, etc.), for example based on SCS or as a single value regardless of SCS. In certain aspects, the UL Tx switching time and/or the uplink data preparation time is reported from the UE 120 to the BS 110 as an index value. The UE 120 and BS 110 may be configured with a mapping of index values (e.g., a separate mapping for each of UL Tx switching time and/or uplink data preparation time) to numbers of symbols and/or time values. In certain aspects, the UL Tx switching time is reported from the UE 120 to the BS 110 as a UE capability.

In certain aspects, if the UL Tx switching time of the UE 120 is zero, the UE 120 does not report or refrains from reporting the UL Tx switching time and/or the uplink data preparation time to the BS 110, and the BS 110 assumes a UL Tx switching time of zero for the UE 120 by default.

The BS 110 is then configured to take into account the capability of UL Tx switching time and/or the capability of uplink data preparation time of the UE 120 for scheduling resources (e.g., time resources, symbols, etc.) on an uplink for the UE 120 to transmit (e.g., data, control information, etc.) to the BS 110. For example, the BS 110 schedules uplink resources for transmissions (e.g., PUSCH, sounding reference signal (SRS), other uplink transmissions) by the UE 120 to the BS 110 only after (e.g., after a PDCCH transmission by the BS 110) an uplink data preparation time of the UE 120 based on the reporting. The BS 110 may schedule the UE 120 with such resources, such as by transmitting one or more uplink grants of the resources to the UE 120 in a downlink (e.g., PDCCH).

In certain aspects, instead of UE 120 reporting UL Tx switching time and/or the uplink data preparation time to the BS 110, the UE 120 and BS 110 are pre-configured to use one or more uplink data preparation times that accommodate for or are based on UL Tx switching time of UEs. For example, one or more uplink data preparation times may be pre-defined, such as in a standard, and the UE 120 and BS 110 are configured to use the one or more uplink data preparation times for uplink scheduling and communication as discussed. In certain aspects, the UE 120 and BS 110 are configured to use an uplink data preparation time that is applicable to all or multiple SCSs, meaning the same uplink data preparation time regardless of the SCS used for communication on the uplink between the UE 120 and the BS 110. In certain aspects, the UE 120 and BS 110 are configured to use an uplink data preparation time that is based on the SCS used for communication on the uplink between the UE 120 and the BS 110. For example, each of the UE 120 and BS 110 may be configured with a mapping of SCSs to uplink data preparation times.

In certain aspects, the UE 120 and/or BS 110 are configured to determine the uplink data preparation time of the UE 120 based on the UL Tx switching time (e.g., defined as $N_4$) of the UE 120.

For example, in certain aspects, a first value A is defined as (e.g., see 3GPP TS 38.214 for definition of the below variables of A):

$$A=(N_2++N_3+d_{2,1})(2048+144)\cdot\kappa 2^{-\mu}\cdot T_C$$

wherein $N_2$ is based on a processing capability (e.g., uplink and/or downlink data processing time) of the UE;

wherein $N_3$ is based on a delay of cross carrier scheduling of the UE;

wherein $d_{2,1}$ is based on a uplink channel (e.g., PUSCH) structure (e.g., 0 or 1) of an uplink channel used by the UE to transmit to the BS;

wherein $\mu$ is based on a SCS used by the UE; and wherein $\kappa$ and $T_C$ are constant values.

In certain aspects, a second value $d_{2,2}$ is based on a bandwidth part (BWP) switching time of the UE (e.g., see 3GPP TS 38.214 for definition of $d_{2,2}$).

In certain aspects, the uplink data preparation time as $T_{proc,2}$ is defined as:

$$T_{proc,2}=\max((N_2+N_3+N_4+d_{2,1})(2048+144)\cdot \kappa 2^{-\mu}\cdot T_C, d_{2,2})$$

In certain such aspects of uplink data preparation time $T_{proc,2}$, $N_4$ is defined in terms of number of symbols. In certain such aspects, uplink data preparation time is based on the SCS used for communication on the uplink between the UE 120 and the BS 110. In certain such aspects, uplink data preparation time is not based on the SCS used for communication on the uplink between the UE 120 and the BS 110.

In certain aspects, the uplink data preparation time as $T_{proc,2}$ is defined as:

$$T_{proc,2} = \max((N_2 + N_3 + d_{2,1})(2048 + 144) \cdot \kappa 2^{-\mu} \cdot T_C, d_{2,2}) + N_4$$

In certain such aspects of uplink data preparation time $T_{proc,2}$, $N_4$ is defined in terms of a time value. In certain such aspects, uplink data preparation time is based on the SCS used for communication on the uplink between the UE 120 and the BS 110. In certain such aspects, uplink data preparation time is not based on the SCS used for communication on the uplink between the UE 120 and the BS 110.

In certain aspects, the uplink data preparation time as $T_{proc,2}$ is defined as:

$$T_{proc,2} = \max((N_2 + N_3 + d_{2,1})(2048 + 144) \cdot \kappa 2^{-\mu} \cdot T_C, d_{2,2}) + N_4 \cdot (2048 + 144) \cdot \kappa 2^{-\mu} \cdot T_C$$

In certain such aspects of uplink data preparation time $T_{proc,2}$, $N_4$ is defined in terms of number of symbols. In certain such aspects, uplink data preparation time is based on the SCS used for communication on the uplink between the UE 120 and the BS 110. In certain such aspects, uplink data preparation time is not based on the SCS used for communication on the uplink between the UE 120 and the BS 110.

In certain aspects, the uplink data preparation time as $T_{proc}$ is defined as:

$$T_{proc} = \max(d_{2,2}, d_{2,3})$$

In certain such aspects of uplink data preparation time $T_{proc}$, $N_4$ is defined in terms of a time value. In certain such aspects, uplink data preparation time is based on the SCS and/or communication frequency (e.g., FR1 or FR2, such as corresponding to sub-6 Ghz and mmW frequencies) used for communication on the uplink between the UE 120 and the BS 110. In certain such aspects, uplink data preparation time is not based on the SCS and/or communication frequency used for communication on the uplink between the UE 120 and the BS 110.

In certain aspects, $d_{2,3} = N_4 + A$. In such aspects, there may be no overlap of UL switching and uplink data preparation at the UE.

In certain aspects, $d_{2,3}$ is within the range [A, $N_4$+A]. In such aspects, there may be partial overlap of UL switching and uplink data preparation at the UE.

In certain aspects, $d_{2,3} = \max(N_4, A)$. In such aspects, the UL switching and uplink data preparation may start at the same time at the UE.

In certain aspects, the uplink data preparation time as $T_{proc}$ is defined as:

$$T_{proc} = \max(A, d_{2,2}) + N_4$$

In certain such aspects of uplink data preparation time $T_{proc}$, $N_4$ is defined in terms of number of symbols or slots. In certain such aspects, uplink data preparation time is based on the SCS used for communication on the uplink between the UE 120 and the BS 110. In certain such aspects, uplink data preparation time is not based on the SCS used for communication on the uplink between the UE 120 and the BS 110.

In certain aspects, the UE 120 reports different UL Tx switching time and/or uplink data preparation time (e.g., separately or together) for different communication frequencies (e.g., FR1 and FR2, such as corresponding to sub-6 Ghz and mmW frequencies). In certain aspects, the UE 120 reports a same UL Tx switching time and/or uplink data preparation time for a plurality of frequency bands (e.g., a combination of related frequency bands).

In certain aspects, a default value for $N_4$ is 0, and a default value for the uplink data preparation time capability is a reported switching time from the UE 120 to the BS 110.

Figure 3:
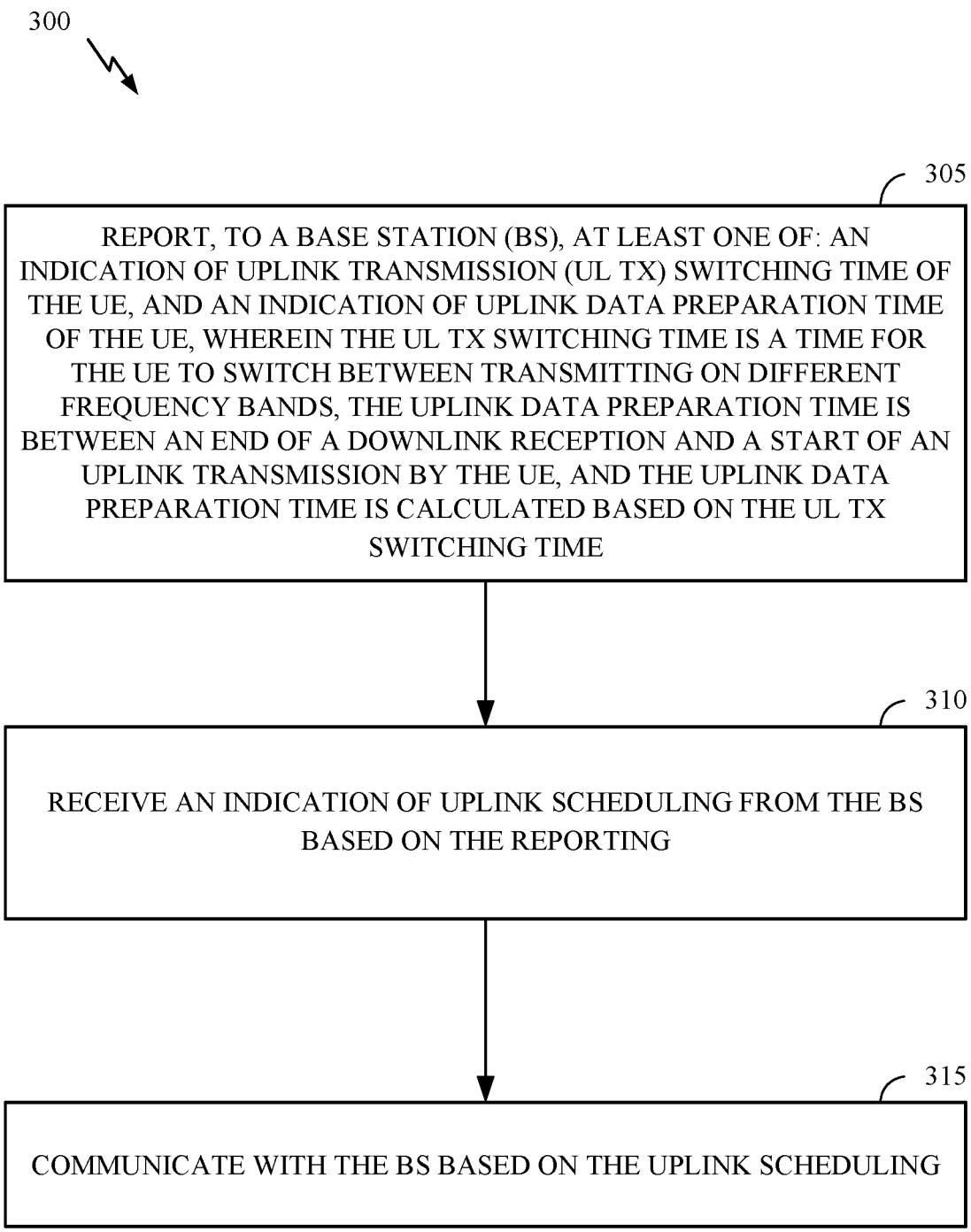
FIG. 3 is a flow diagram illustrating example operations for wireless communication by a UE, in accordance with certain aspects of the present disclosure.

FIG. 3 is a flow diagram illustrating example operations 300 for wireless communication, in accordance with certain aspects of the present disclosure. The operations 300 may be performed, for example, by a UE (e.g., such as a UE 120 in the wireless communication network 100). Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at 305, by reporting, to a base station (BS), at least one of: an indication of uplink transmission (UL Tx) switching time of the UE, and an indication of uplink data preparation time of the UE, wherein the UL Tx switching time is a time for the UE to switch between transmitting on different frequency bands, the uplink data preparation time is between an end of a downlink reception and a start of an uplink transmission by the UE, and the uplink data preparation time is calculated based on the UL Tx switching time. At 310, the UE receives an indication of uplink scheduling from the BS based on the reporting. At 315, the UE communicates with the BS based on the uplink scheduling.

The operations 300 may further include that the UL Tx switching time comprises a number of symbols.

The operations 300 may further include that the UL Tx switching time comprises a time value.

The operations 300 may further include that the UL Tx switching time is based on a subcarrier spacing (SCS) used by the UE for uplink transmission to the BS.

The operations 300 may further include that the indication of UL Tx switching time comprises an index that maps to a time.

The operations 300 may further include that the indication of uplink data preparation time comprises an index that maps to a time.

The operations 300 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, and the uplink data preparation time is calculated based on a maximum of the second value and a third value that is a sum of the first value and the UL Tx switching time.

The operations 300 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, and the uplink data preparation time is calculated based on a maximum of the second value and a third value that is between the first value and a sum of the first value and the UL Tx switching time.

The operations 300 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, the uplink data preparation time is calculated based on a maximum of the second value and a third value, and the third value is based on a maximum of the first value and the UL Tx switching time.

The operations 300 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, and the uplink data preparation time is calculated based on a sum of the UL Tx switching time and a maximum of the first value and the second value.

The operations 300 may further include that reporting comprises reporting the at least one of the indication of UL Tx switching time and the indication of uplink data preparation for a first communication frequency, and further include reporting at least one of a second indication of UL Tx switching time and a second indication of uplink data preparation for a second communication frequency.

The operations 300 may further include that the reporting comprises reporting the at least one of the indication of UL Tx switching time and the indication of uplink data preparation for a plurality of frequency bands.

The operations 300 may further include that the UL Tx switching time is an accurate time that may or may not be related to subcarrier spacing and communication frequency.

The operations 300 may further include that a default value of the UL Tx switching time is zero.

FIG. 4 is a flow diagram illustrating example operations 400 for wireless communication, in accordance with certain aspects of the present disclosure. The operations 400 may be performed, for example, by a BS (e.g., such as a BS 110 in the wireless communication network 100). The operations 400 may be complimentary operations by the BS to the operations 300 performed by the UE. Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at 405, by receiving, from a user equipment (UE), a report of at least one of an indication of uplink transmission (UL Tx) switching time of the UE, and an indication of uplink data preparation time of the UE, wherein the UL Tx switching time is a time for the UE to switch between transmitting on different frequency bands, the uplink data preparation time is between an end of a downlink reception and a start of an uplink transmission by the UE, and the uplink data preparation time is calculated based on the UL Tx switching time. At 410, the BS determines uplink scheduling for the UE based on the report. At 415, the BS transmits an indication of the uplink scheduling to the UE. At 420, the BS communicates with the UE based on the uplink scheduling.

The operations 400 may further include that the UL Tx switching time comprises a number of symbols.

The operations 400 may further include that the UL Tx switching time comprises a time value.

The operations 400 may further include that the UL Tx switching time is based on a subcarrier spacing (SCS) used by the UE for uplink transmission to the BS.

The operations 400 may further include that the indication of UL Tx switching time comprises an index that maps to a time.

The operations 400 may further include that the indication of uplink data preparation time comprises an index that maps to a time.

The operations 400 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE; and, and the uplink data preparation time is calculated based on a maximum of the second value and a third value that is a sum of the first value and the UL Tx switching time.

The operations 400 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE; and, and the uplink data preparation time is calculated based on a maximum of the second value and a third value that is between the first value and a sum of the first value and the UL Tx switching time.

The operations 400 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, the uplink data preparation time is calculated based on a maximum of the second value and a third value, and the third value is based on a maximum of the first value and the UL Tx switching time.

The operations 400 may further include a first value is based on a processing capability of the UE, a delay of cross carrier scheduling of the UE, a subcarrier spacing (SCS) used by the UE, and an uplink channel structure of an uplink channel used by the UE to transmit to the BS, a second value is based on a bandwidth part (BWP) switching time of the UE, and the uplink data preparation time is calculated based on a sum of the UL Tx switching time and a maximum of the first value and the second value.

The operations 400 may further include that the report comprises a report of the at least one of the indication of UL Tx switching time and the indication of uplink data preparation for a first communication frequency, and further include receiving a report of at least one of a second indication of UL Tx switching time and a second indication of uplink data preparation for a second communication frequency.

The operations 400 may further include that the report comprises a report of the at least one of the indication of UL Tx switching time and the indication of uplink data preparation for a plurality of frequency bands.

The operations 400 may further include that the UL Tx switching time is an accurate time that may or may not be related to subcarrier spacing and communication frequency.

The operations 400 may further include that a default value of the UL Tx switching time is zero.

Figure 5:
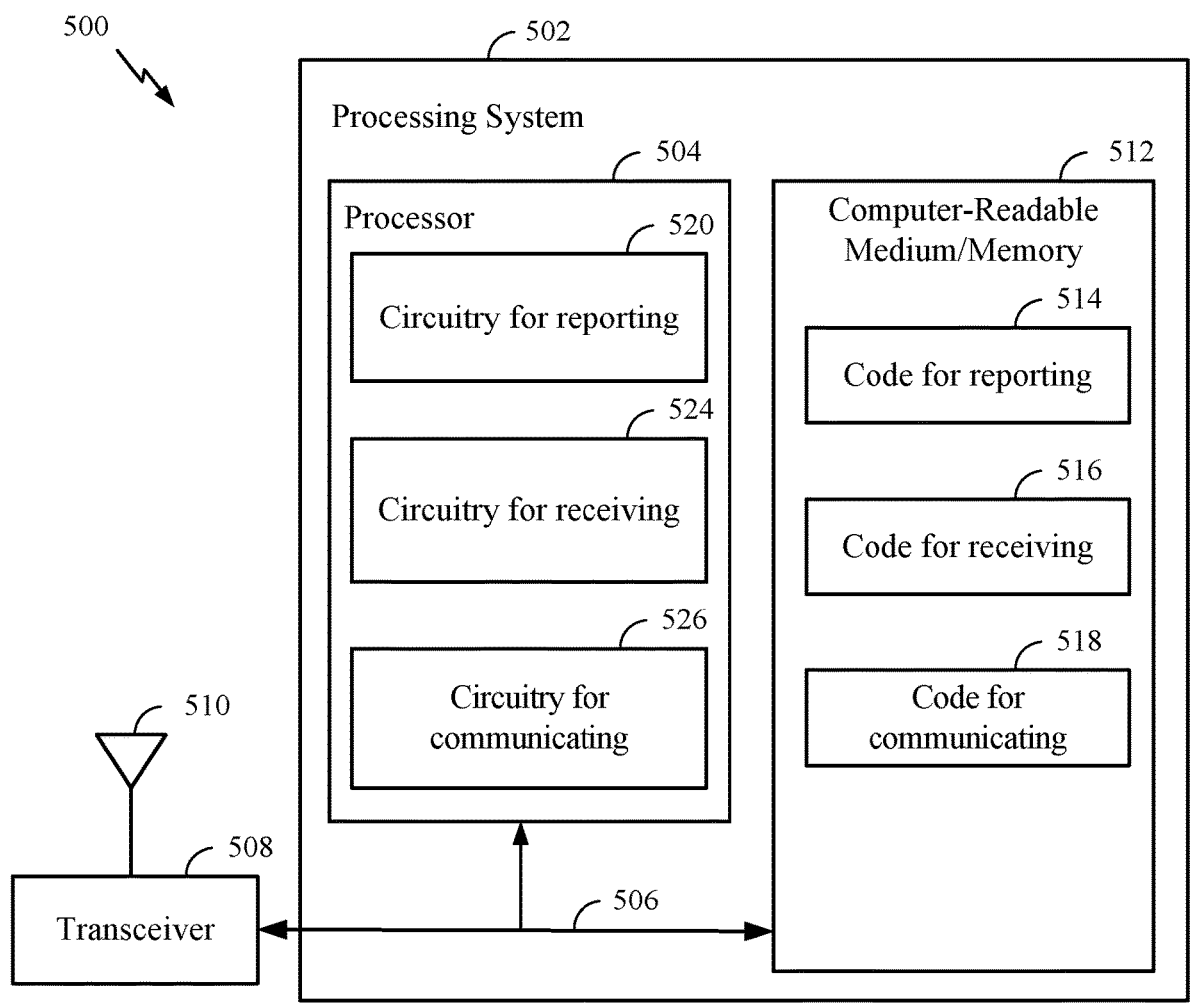
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components) configured to perform operations for the techniques disclosed herein, such as the operations illustrated in FIG. 3. The communications device 500 includes a processing system 502 coupled to a transceiver

508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIG. 3, or other operations for performing the various techniques discussed herein for uplink scheduling for communication on an uplink from a user equipment (UE) to a base station (BS). In certain aspects, computer-readable medium/memory 512 stores code 514 for reporting, such as code for reporting, to a BS, at least one of an indication of uplink transmission (UL Tx) switching time of the UE, and an indication of uplink data preparation time of the UE, wherein the UL Tx switching time is a time for the UE to switch between transmitting on different frequency bands, the uplink data preparation time is between an end of a downlink reception and a start of an uplink transmission by the UE, and the uplink data preparation time is calculated based on the UL Tx switching time; code 516 for receiving, such as code for receiving an indication of uplink scheduling from the BS based on the reporting; and code 518 for communicating, such as code for communicating with the BS based on the uplink scheduling. In certain aspects, the processor 504 has circuitry configured to implement the code stored in the computer-readable medium/memory 512. The processor 504 includes circuitry 520 for reporting, circuitry 524 for receiving, and/or circuitry 526 for communicating, in accordance with one or more aspects of the present disclosure. The circuitries 520-526 can implement operations provided by the codes 514-518 when the processor 504 executes the codes in the computer-readable medium/memory 512.

Figure 6:
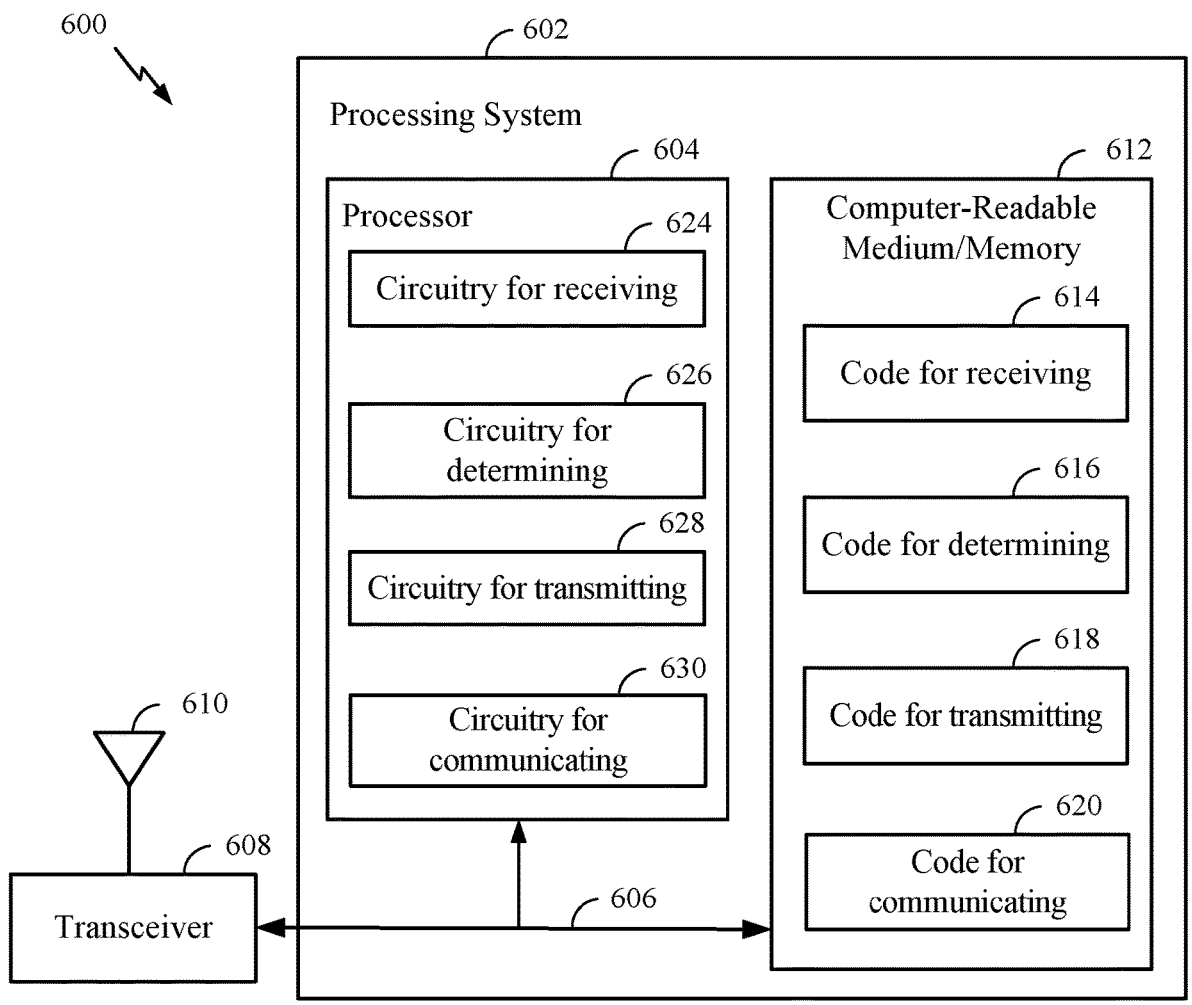
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4, or other operations for performing the various techniques discussed herein for uplink scheduling for communication on an uplink from a user equipment (UE) to a base station (BS). In certain aspects, computer-readable medium/memory 612 stores code 614 for receiving, such as code for receiving, from a UE, a report of at least one of an indication of uplink transmission (UL Tx) switching time of the UE, and an indication of uplink data preparation time of the UE, wherein the UL Tx switching time is a time for the UE to switch between transmitting on different frequency bands, the uplink data preparation time is between an end of a downlink reception and a start of an uplink transmission by the UE, and the uplink data preparation time is calculated based on the UL Tx switching time; code 616 for determining, such as code for determining uplink scheduling for the UE based on the report; code 618 for transmitting, such as code for transmitting an indication of the uplink scheduling to the UE; and code 620 for communicating, such as code for communicating with the UE based on the uplink scheduling. In certain aspects, the processor 604 has circuitry configured to implement the code stored in the computer-readable medium/memory 612. The processor 604 includes circuitry 624 for receiving, circuitry 626 for determining, circuitry 628 for transmitting and/or circuitry 630 for communicating, in accordance with one or more aspects of the present disclosure. The circuitries 624-630 can implement operations provided by the codes 614-620 when the processor 604 executes the codes in the computer-readable medium/memory 612.

Figure 7:
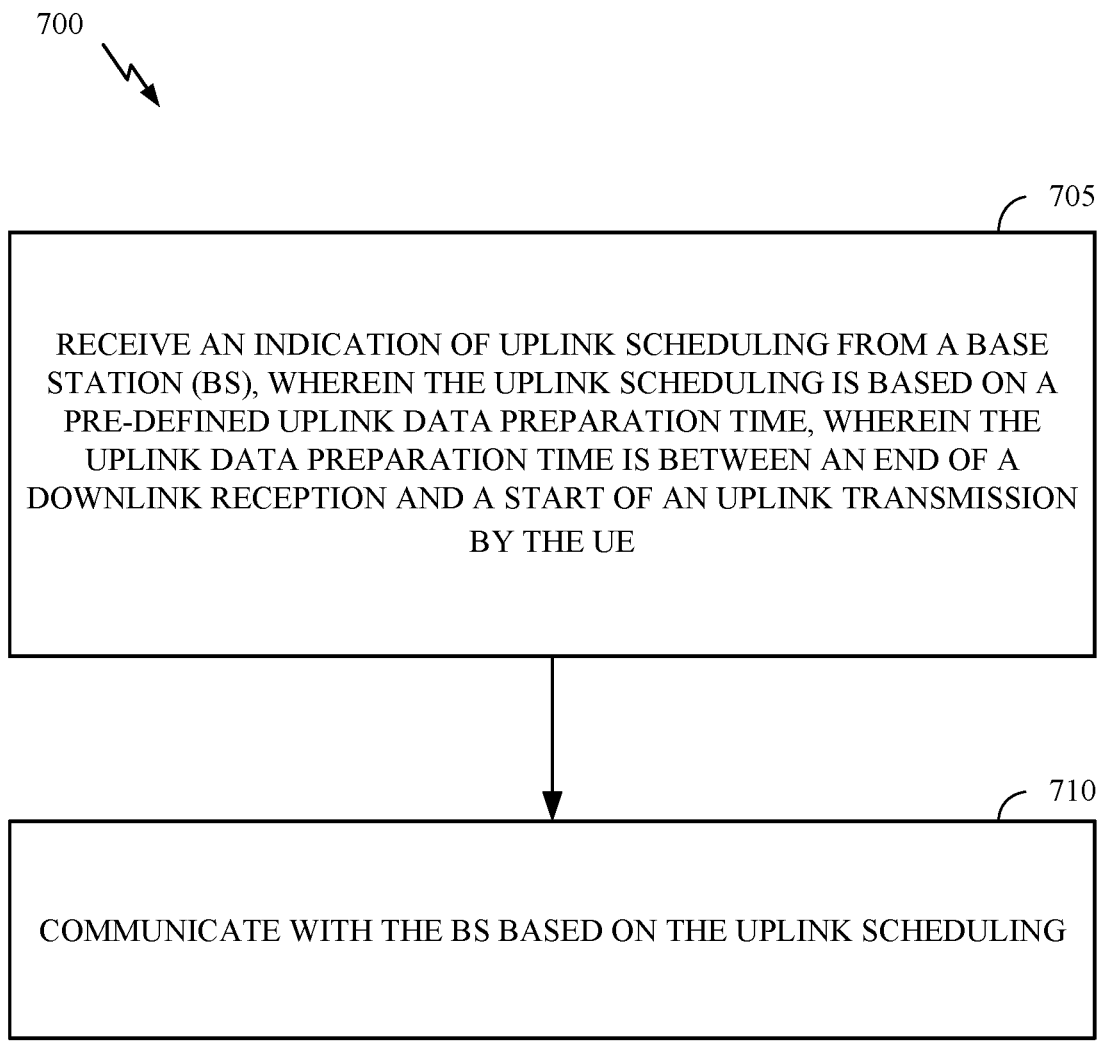
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as a UE 120 in the wireless communication network 100). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 705, by receiving an indication of uplink scheduling from a base station (BS), wherein the uplink scheduling is based on a pre-defined uplink data preparation time, wherein the uplink data preparation time is between an end of a downlink reception and a start of an uplink transmission by the UE. At 710, the UE communicates with the BS based on the uplink scheduling.

The operations 700 may further include that the pre-defined uplink data preparation time is based on a subcarrier spacing used by the UE for uplink transmission to the BS.

Figure 8:
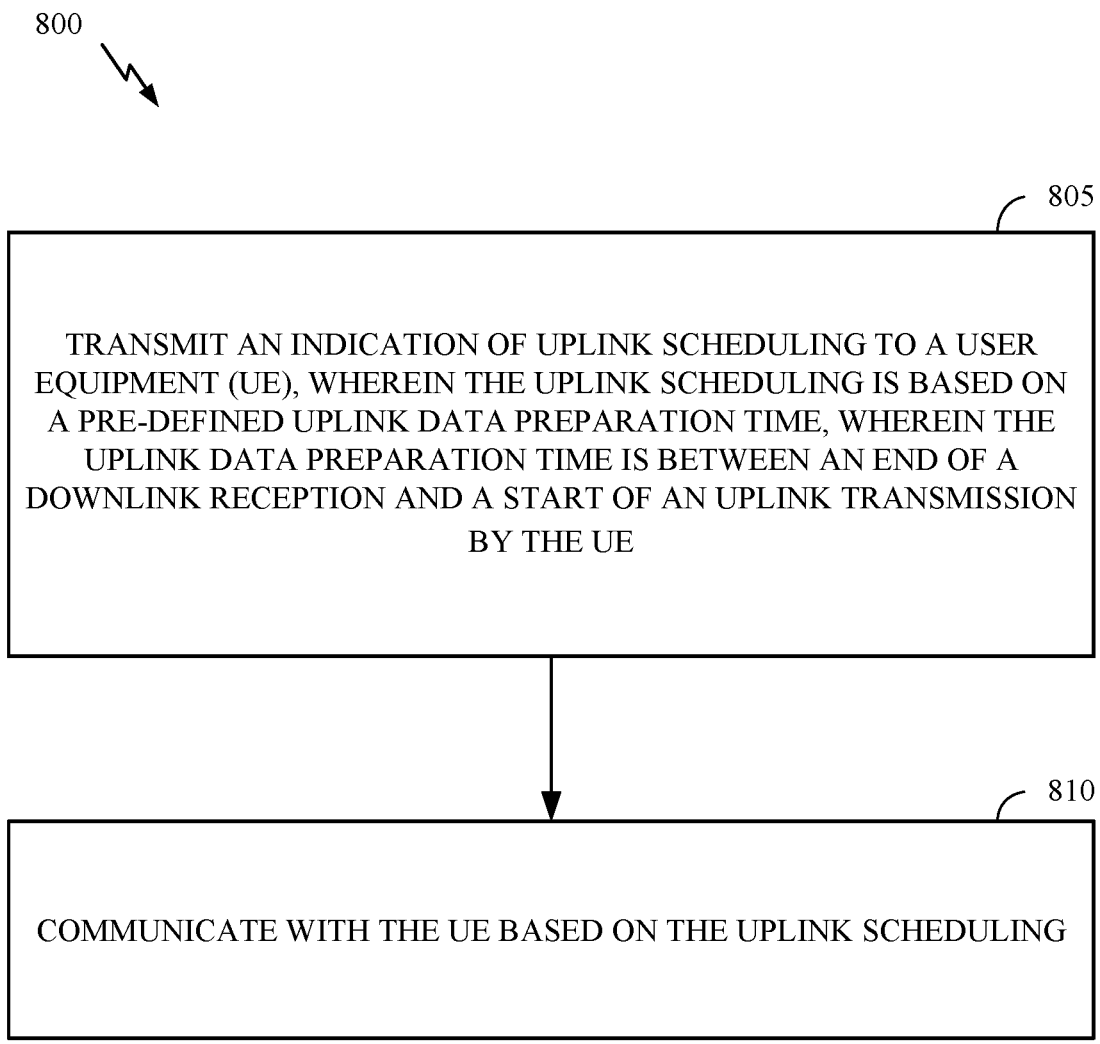
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as a BS 110 in the wireless communication network 100). The operations 800 may be complimentary operations by the BS to the operations 700 performed by the UE. Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at 805, by transmitting an indication of uplink scheduling to a user equipment (UE), wherein the uplink scheduling is based on a pre-defined uplink data preparation time, wherein the uplink data preparation time is between an end of a downlink reception and a start of an uplink transmission by the UE. At 810, the BS communicates with the UE based on the uplink scheduling.

The operations 800 may further include that the pre-defined uplink data preparation time is based on a subcarrier spacing used by the UE for uplink transmission to the BS.

Figure 9:
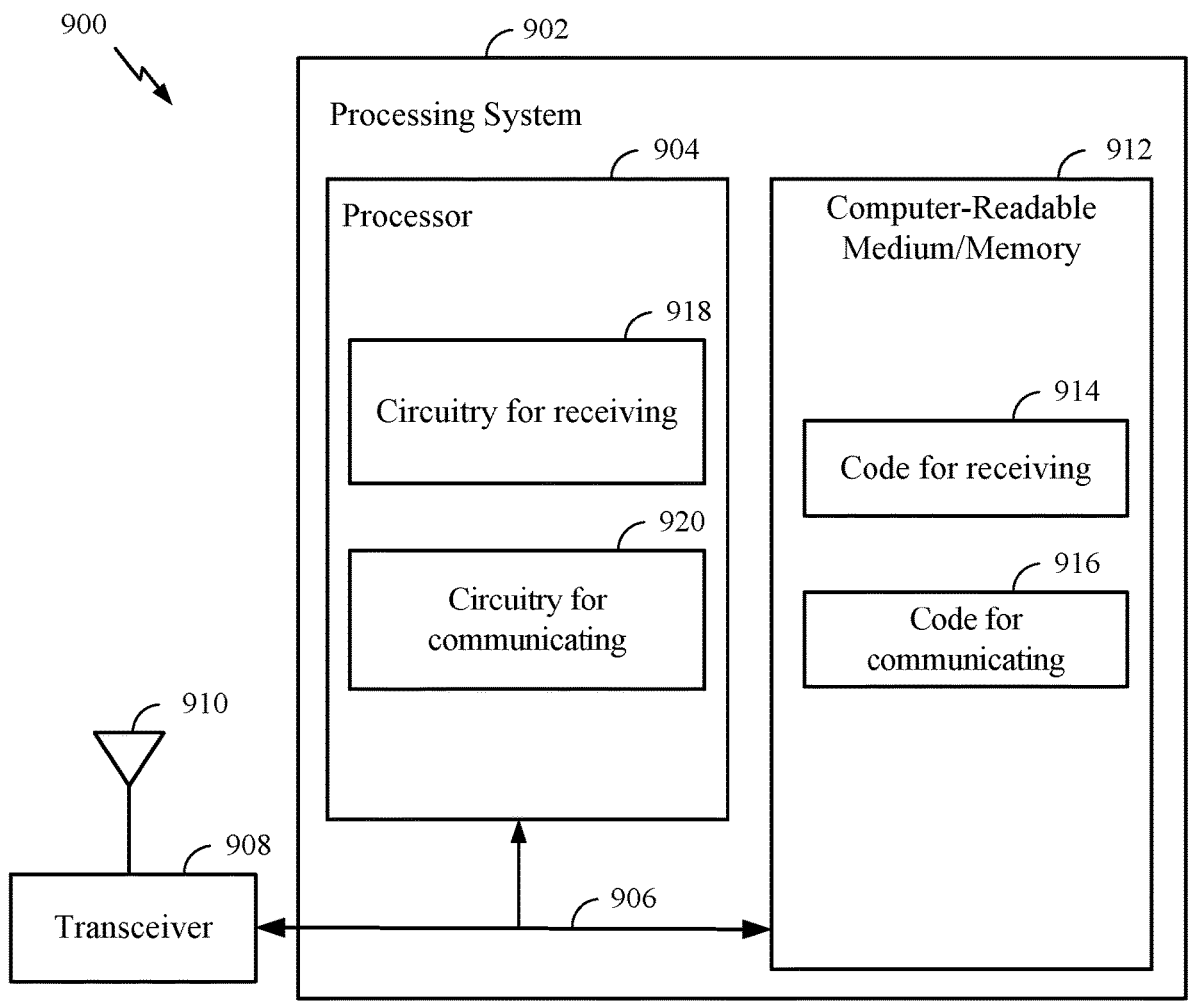
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for uplink scheduling for communication on an uplink from a user equipment (UE) to a base station (BS). In certain aspects, computer-readable medium/memory 912 stores code 914 for receiving, such as code for receiving an indication of uplink scheduling from a base station (BS), wherein the uplink scheduling is based on a pre-defined uplink data preparation time, wherein the uplink data preparation time is between an end of a downlink reception and a start of an uplink transmission by the UE; and code 916 for communicating, such as code for communicating with the BS based on the uplink scheduling. In certain aspects, the processor 904 has circuitry configured to implement the code stored in the computer-readable medium/memory 912. The processor 904 includes circuitry 918 for receiving and/or circuitry 920 for communicating, in accordance with one or more aspects of the present disclosure. The circuitries 918-920 can implement operations provided by the codes 914-916 when the processor 904 executes the codes in the computer-readable medium/memory 912.

Figure 10:
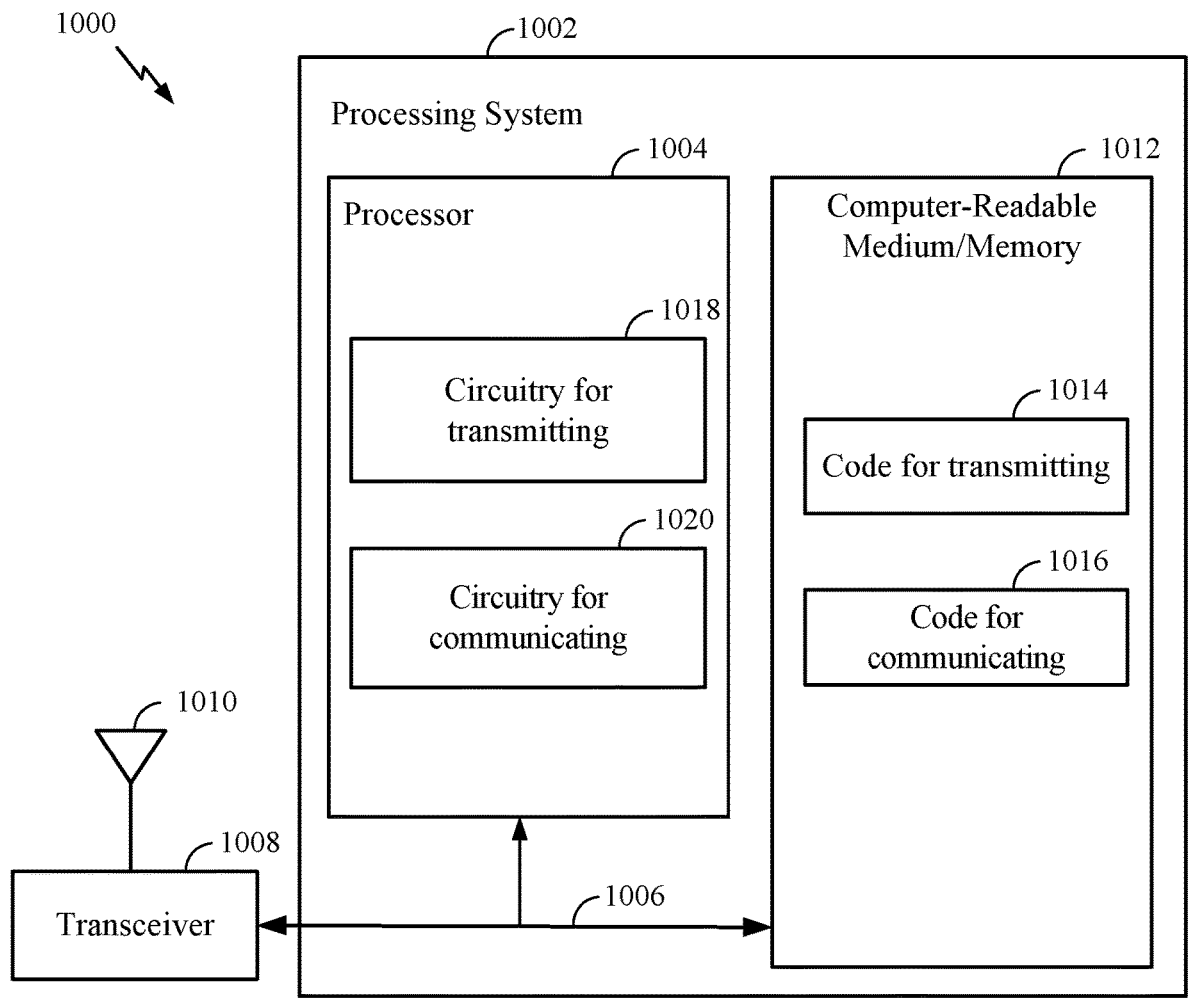
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for uplink scheduling for communication on an uplink from a user equipment (UE) to a base station (BS). In certain aspects, computer-readable medium/memory 1012 stores code 1014 for transmitting, such as code for transmitting an indication of uplink scheduling to a user equipment (UE), wherein the uplink scheduling is based on a pre-defined uplink data preparation time, wherein the uplink data preparation time is between an end of a downlink reception and a start of an uplink transmission by the UE; and code 1016 for communicating, such as code for communicating with the UE based on the uplink scheduling. In certain aspects, the processor 1004 has circuitry configured to implement the code stored in the computer-readable medium/memory 1012. The processor 1004 includes circuitry 1018 for transmitting and/or circuitry 1020 for communicating, in accordance with one or more aspects of the present disclosure. The circuitries 1018-1020 can implement operations provided by the codes 1014-1016 when the processor 1004 executes the codes in the computer-readable medium/memory 1012.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 3, 4, 7, and/or 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
reporting, to a network node, a first indication of uplink transmission (UL Tx) switching time of the UE for a first communication frequency and an uplink data preparation time, wherein the UL Tx switching time is a time for the UE to switch between transmitting on different frequency bands, and wherein the uplink data preparation time is an amount of time between an end of a downlink reception and a start of an uplink transmission by the UE;
reporting a second indication of UL Tx switching time for a second communication frequency, the second indication of UL Tx switching time being different than the first indication of UL Tx switching time;
receiving an indication of uplink scheduling from the network node for the first communication frequency or the second communication frequency based on the reporting; and
communicating with the network node based on the uplink scheduling.

2. The method of claim 1, wherein the UL Tx switching time comprises a number of symbols.

3. The method of claim 1, wherein the UL Tx switching time comprises a time value.

4. The method of claim 1, wherein the UL Tx switching time is based on a subcarrier spacing (SCS) used by the UE for uplink transmission to the network node.

5. The method of claim 1, wherein the reported first indication of UL Tx switching time comprises an index from a plurality of indices, each index in the plurality of indices mapping a value of the index to a corresponding time value.

6. The method of claim 1, wherein:
a first value is based on a processing capability of the UE, a delay of cross carrier scheduling of the UE, a subcarrier spacing (SCS) used by the UE, and an uplink channel structure of an uplink channel used by the UE to transmit to the network node;
a second value is based on a bandwidth part (BWP) switching time of the UE;
a third value is a sum of the first value and the UL Tx switching time; and
the uplink data preparation time of the UE is calculated based on a maximum of the second value and the third value.

7. The method of claim 1, wherein the reporting comprises reporting the first indication of UL Tx switching time for a plurality of frequency bands.

8. A method for wireless communication by a network node, the method comprising:
receiving, from a user equipment (UE), a report of a first indication of uplink transmission (UL Tx) switching time of the UE for a first communication frequency and an uplink data preparation time of the UE, wherein the UL Tx switching time is a time for the UE to switch between transmitting on different frequency bands, and wherein the uplink data preparation time is an amount of time between an end of a downlink reception and a start of an uplink transmission by the UE;
receiving a report of a second indication of UL Tx switching time for a second communication frequency, the second indication of UL Tx switching time being different than the first indication of UL Tx switching time;
determining uplink scheduling for the UE for the first communication frequency or the second communication frequency based on the report;
transmitting an indication of the uplink scheduling to the UE; and
communicating with the UE based on the uplink scheduling.

9. The method of claim 8, wherein the UL Tx switching time comprises a number of symbols.

10. The method of claim 8, wherein the UL Tx switching time comprises a time value.

11. The method of claim 8, wherein the UL Tx switching time is based on a subcarrier spacing (SCS) used by the UE for uplink transmission to the network node.

12. The method of claim 8, wherein the reported first indication of UL Tx switching time comprises an index from a plurality of indices, each index in the plurality of indices mapping a value of the index to a corresponding time value.

13. The method of claim 8, wherein:
a first value is based on a processing capability of the UE, a delay of cross carrier scheduling of the UE, a subcarrier spacing (SCS) used by the UE, and an uplink channel structure of an uplink channel used by the UE to transmit to the network node;
a second value is based on a bandwidth part (BWP) switching time of the UE; a third value is a sum of the first value and the UL Tx switching time; and
the uplink data preparation time of the UE is calculated based on a maximum of the second value and the third value.

14. The method of claim 8, wherein the report comprises a report of the first indication of UL Tx switching time for a plurality of frequency bands.

15. A user equipment (UE) configured for wireless communications, comprising:
a memory comprising computer-executable instructions; and
one or more processors configured to execute the computer-executable instructions and cause the UE to:
report, to a network node, a first indication of uplink transmission (UL Tx) switching time of the UE for a first communication frequency and an uplink data preparation time, wherein the UL Tx switching time is a time for the UE to switch between transmitting on different frequency bands, and wherein the uplink data preparation time is an amount of time between an end of a downlink reception and a start of an uplink transmission by the UE;

report a second indication of UL Tx switching time for a second communication frequency, the second indication of UL Tx switching time being different than the first indication of UL Tx switching time;

receive an indication of uplink scheduling from the network node for the first communication frequency or the second communication frequency based on the reporting; and communicate with the network node based on the uplink scheduling.

16. The UE of claim 15, wherein the UL Tx switching time comprises a number of symbols.

17. The UE of claim 15, wherein the UL Tx switching time comprises a time value.

18. The UE of claim 15, wherein the UL Tx switching time is based on a subcarrier spacing (SCS) used by the UE for uplink transmission to the network node.

19. The UE of claim 15, wherein the reported first indication of UL Tx switching time comprises an index from a plurality of indices, each index in the plurality of indices mapping a value of the index to a corresponding time value.

20. The UE of claim 15, wherein:
a first value is based on a processing capability of the UE, a delay of cross carrier scheduling of the UE, a subcarrier spacing (SCS) used by the UE, and an uplink channel structure of an uplink channel used by the UE to transmit to the network node;
a second value is based on a bandwidth part (BWP) switching time of the UE; a third value is a sum of the first value and the UL Tx switching time; and
the uplink data preparation time of the UE is calculated based on a maximum of the second value and the third value.

21. A network node configured for wireless communications, comprising:
a memory comprising computer-executable instructions; and
one or more processors configured to execute the computer-executable instructions and cause the network node to:
receive, from a user equipment (UE), a report of a first indication of uplink transmission (UL Tx) switching time of the UE for a first communication frequency and an uplink data preparation time, wherein the UL Tx switching time is a time for the UE to switch between transmitting on different frequency bands, and wherein the uplink data preparation time is an amount of time between an end of a downlink reception and a start of an uplink transmission by the UE;
receive a report of a second indication of UL Tx switching time for a second communication frequency, the second indication of UL Tx switching time being different than the first indication of UL Tx switching time;
determine uplink scheduling for the UE for the first communication frequency or the second communication frequency based on the report;
transmit an indication of the uplink scheduling to the UE; and
communicate with the UE based on the uplink scheduling.

22. The network node of claim 21, wherein the UL Tx switching time comprises a number of symbols.

23. The network node of claim 21, wherein the UL Tx switching time comprises a time value.

24. The network node of claim 21, wherein the UL Tx switching time is based on a subcarrier spacing (SCS) used by the UE for uplink transmission to the network node.

25. The network node of claim 21, wherein the reported first indication of UL Tx switching time comprises an index from a plurality of indices, each index in the plurality of indices mapping a value of the index to a corresponding time value.

26. The network node of claim 21, wherein:
a first value is based on a processing capability of the UE, a delay of cross carrier scheduling of the UE, a subcarrier spacing (SCS) used by the UE, and an uplink channel structure of an uplink channel used by the UE to transmit to the network node;
a second value is based on a bandwidth part (BWP) switching time of the UE;
a third value is a sum of the first value and the UL Tx switching time; and
the uplink data preparation time of the UE is calculated based on a maximum of the second value and the third value.

27. A non-transitory computer readable medium storing instructions that, when executed by a processor of a user equipment (UE), cause the UE to:
report, to a network node, a first indication of uplink transmission (UL Tx) switching time of the UE for a first communication frequency and an uplink data preparation time, wherein the UL Tx switching time is a time for the UE to switch between transmitting on different frequency bands, and wherein the uplink data preparation time is an amount of time between an end of a downlink reception and a start of an uplink transmission by the UE;
report a second indication of UL Tx switching time for a second communication frequency, the second indication of UL Tx switching time being different than the first indication of UL Tx switching time;
receive an indication of uplink scheduling from the network node for the first communication frequency or the second communication frequency based on the reporting; and
communicate with the network node based on the uplink scheduling.

* * * * *